United States Patent
Bundy et al.

(10) Patent No.: US 7,452,267 B2
(45) Date of Patent: Nov. 18, 2008

(54) SYSTEM AND METHOD FOR AUTOMATICALLY DESLUGGING AN AGRICULTURAL COMBINE

(75) Inventors: John E. Bundy, East Aurora, NY (US);
John G. Brome, Delavan, WI (US);
Yun-Ren Ho, Naperville, IL (US);
Richard E. McMillen, Loudon, TN (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/725,821

(22) Filed: Mar. 20, 2007

(65) Prior Publication Data

US 2008/0234017 A1    Sep. 25, 2008

(51) Int. Cl.
*A01D 75/18*    (2006.01)
*A01F 12/16*    (2006.01)
*A01F 21/00*    (2006.01)

(52) U.S. Cl. .......................................................... 460/6
(58) Field of Classification Search .................... 460/6, 460/1, 4, 7, 2, 103, 116; 56/10.2 R, 10.2 J, 56/10.8, 11.1, 16.4–16.8; 364/424.01, 424.07, 364/148, 150, 151
See application file for complete search history.

(56) References Cited

U.S. PATENT DOCUMENTS

| | | | | |
|---|---|---|---|---|
| 3,608,557 | A * | 9/1971 | Evans | 460/103 |
| 3,958,397 | A * | 5/1976 | Stiff | 56/10.3 |
| 4,143,664 | A | 3/1979 | Chorney | 130/9 A |
| 4,376,298 | A | 3/1983 | Sokol et al. | 354/551 |
| 4,396,087 | A * | 8/1983 | Rock et al. | 180/243 |
| 4,527,241 | A | 7/1985 | Sheehan et al. | 364/424 |
| 4,776,154 | A * | 10/1988 | Weiss et al. | 56/10.2 J |
| 5,600,942 | A | 2/1997 | Strosser | 56/10.25 |
| 5,699,247 | A | 12/1997 | Moriya et al. | 364/424.07 |
| 5,873,227 | A * | 2/1999 | Arner | 56/14.6 |
| 5,889,671 | A | 3/1999 | Autermann et al. | 364/188 |
| 6,059,656 | A * | 5/2000 | Satzler | 460/116 |
| 6,105,347 | A * | 8/2000 | Behnke | 56/10.2 J |
| 6,213,870 | B1 * | 4/2001 | Satzler | 460/6 |
| 6,381,932 | B1 * | 5/2002 | Clauss | 56/10.2 J |
| 6,651,412 | B1 * | 11/2003 | Sierk et al. | 56/10.3 |
| 6,666,007 | B2 * | 12/2003 | Schroeder | 56/10.6 |
| 6,726,559 | B2 | 4/2004 | Bischoff | 460/1 |
| 6,843,044 | B2 * | 1/2005 | Clauss | 56/10.3 |
| 6,863,604 | B2 | 3/2005 | Behnke | 460/6 |
| 2001/0016794 | A1 | 8/2001 | Falck et al. | 701/50 |
| 2004/0014509 | A1 * | 1/2004 | Brome et al. | 460/1 |
| 2004/0093841 | A1 * | 5/2004 | Clauss | 56/16.4 R |
| 2005/0198936 | A1 * | 9/2005 | Viaud | 56/341 |
| 2007/0026910 | A1 * | 2/2007 | Brome et al. | 460/6 |

FOREIGN PATENT DOCUMENTS

| EP | 0586999 | 3/1994 |
|---|---|---|
| GB | 2035029 | 11/1978 |

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A deslugging method and system for an agricultural combine, providing several semi- and fully automated operating modes or routines for removing or dislodging a slug of crop and/or other material from the threshing system and/or a feeder of the combine for conveying crop material to the threshing system. The routines can include reciprocating, agitating and jogging routines, which can be automatically altered during execution responsive to sensed or changing conditions, as processed by a suitable filter such as a simplified Kalman type signal filter, for generating a real time estimation and prediction of the various states of the threshing system.

18 Claims, 10 Drawing Sheets

SYSTEM AND METHOD FOR AUTOMATICALLY DESLUGGING AN AGRICULTURAL COMBINE

TECHNICAL FIELD

This invention relates generally to an agricultural combine, and more particularly, to a threshing system and operating method therefor, providing several semi- and fully automated operating modes for removing or dislodging a slug of crop and/or other material from the threshing system and/or a feeder of the combine for conveying crop material to the threshing system.

BACKGROUND ART

Agricultural combines comprise a variety of apparatus and systems for receiving and processing crops. In particular, a combine will include a header operable for severing crops and other plant material from root structure and conveying the severed crop and plant material to a feeder of the combine. The feeder will typically include an enclosed feeder housing containing a conveyor mechanism, which conveying mechanism will typically include parallel chains connected by slats, which chains encircle sprockets which are driven by a feeder drive to move the chains and slats upwardly and rearwardly along a floor of the housing, for inducting and conveying the crop and plant material, as well as debris that may be contained therein, into an inlet region of a threshing system of the combine. The threshing system, in turn, will typically include at least one rotor rotatable within a cavity or space defined at least partially by a concave structure having an array or arrays of openings therein sized for passage of grain therethrough. The rotor will include elements for inducting the crop and other material into the cavity and conveying the material through a crop separation clearance between the outer region of the rotor and the inner region of the concave, for separating grain and other small elements of the crop material from larger elements thereof, typically including leaves, stalks, cobs, husks and the like, depending on the crop being harvested. The separated grain is then expected to pass through the openings of the concave for further processing.

From time to time during operation of an agricultural combine, a slug, that is, an incorrectly processed and/or compacted mass of crop material and/or weeds, particularly stringy or viny weeds, debris, or other material, may be inducted into the feeder and/or threshing system and become lodged or packed or jammed, to possibly interrupt throughput of crop material through the combine, and/or damage to components of the feeder and/or threshing system, thus necessitating removal of the slug. Removal of the slug can entail backing it away from the location within the feeder and/or threshing system at which it became lodged, sufficiently so as to break it up or better process or compact it for passage through the feeder and/or threshing system.

Once a slug has developed in the feeder or threshing system of a combine, a number of different actions depending on, the combine status, the type, severity and location of the slug, may be necessary to effect removal of the slug. For instance, in what can be deemed a simple case, it may be sufficient to repeatedly jog the rotor through small angular movements, until the resulting low impulsive loads breakdown the slug and free it. In a more extreme example, it may be necessary to more violently rock the rotor back and forth in an agitating motion, at different amplitudes and different frequencies, occasionally with an asymmetric motion and relatively large impulsive loads, for extended periods of time, to incrementally dislodge or work the slug free. In an even more extreme example, manual intervention may be required, to open up the rotor/concave/feeder system, and manually clear the slug piece by piece. Sometimes in such more extreme instances components of the rotor/concave/feeder system may be forced out of adjustment or damaged by the slug. Obviously, manual removal of a slug can be time-consuming and labor intensive.

Thus, what is sought is a system and method for automatically deslugging the threshing and/or feeder system of an agricultural combine, which overcomes one or more of the shortcomings and limitations set forth above.

SUMMARY OF THE INVENTION

What is disclosed is a system and method for automatically deslugging the threshing and/or feeder system of a combine, which overcomes one or more of the shortcomings and limitations set forth above.

According to a preferred aspect of the invention, the system provides several selectable automatic routines or methods of operation of a drive for rotating a rotor of a threshing system, each of which routines provides a sequence of movements which has been found to be advantageous for dislodging, breaking up and/or freeing slugs or clogs of plant material and/or debris from the crop separation clearance between the rotor and the concave. The routines also have utility for operating a feeder, for freeing, dislodging and/or breaking up slugs therein.

An advantage of the invention is that the deslugging routines can be automatically executed, such that speeds, directional changes, and other parameters of the deslugging motion, such as profile and frequency, and resultant impulsive loading conditions useful for dislodging a slug, can be achieved in a controlled manner, without requiring direct operator controlled actions. This can eliminate differences in deslugging capability resulting from different operator skill levels, consistency and/or experience.

Another advantage is that the system will be more sensitive and responsive to the effects of the deslugging actions than, for instance, an operator relying on experience, sounds, feel, instrument readings or signals. It is thus expected that less or no damage to the combine will occur as a result of the automatic threshing deslugging routines.

A preferred method of the invention includes steps including providing a drive controllably operable for rotating the rotor of the threshing system within the concave thereof in opposite first and second rotational directions. This will typically comprise the existing rotor drive, which may be a conventional mechanical or hydro-mechanical, or hydro-drive.

Another step is providing a control, preferably processor based, in automatic operative control of the drive. This will typically comprise the existing or conventional microprocessor control.

Another step is providing at least one sensor for sensing information representative of load conditions opposing rotation of the rotor. This can include, for instance a pressure transducer operable for sensing pressure conditions of the hydraulic portion of a hydro-mechanical drive. Other sensors and sensed information preferably include, but are not limited to, a speed sensor for the mechanical input of the drive; stroke control valve information for the hydraulic input; and speed sensors for the hydraulic drive output and for the rotor. According to a preferred aspect of the invention, the control is programmed to include a suitable signal filtering and processing capability for the application and/or the sensor and other signals being processed, which can be, for instance, but is not limited to, a simplified Kalman type filter operable for filtering noise from the signals and processing and using them with information representative of a current (or previous) state or states to estimate or predict the future current state of the sensed parameters and pertinent aspects of the threshing system. Information representative of the estimated or predicted state of the system is used by the control for executing the deslugging routine, and optionally for selecting the deslugging routine to be used.

And, the invention includes providing a plurality of selectable deslugging routines automatically executable by the control for controlling the drive.

Also preferably, prior to or during initial rotation of the rotor during execution of the routines, the concave is moved away from the rotor, for instance using a remotely controlled actuator provided for setting the crop separation clearance, and a gearbox or transmission of the drive is shifted into a low gear or speed range.

To execute a deslugging routine according to the invention, the routine is selected using an operator input device, and the controller automatically executes the routine. Or, optionally, the control can be programmed for automatically selecting or suggesting the routine to be used, and/or for adapting parameters of the routine to be used, for instance, as a function of the current or predicted state of the threshing system, as estimated or predicted and modeled using the simplified Kalman filter or other program or routine providing a suitable signal filtering and processing capability. Thus the system of the invention, by virtue of usage of the signal filtering and processing capability, can be configured as an adaptive system.

Examples of preferred deslugging routines according to the invention include, but are not limited to, automatic jogging or reciprocating actions or movements of controlled travel or extent. Others automatically vary or alter the direction of rotation and/or duration of rotation in a direction responsive to sensed conditions representative of, for instance, opposition to the rotation resulting from a slug, and/or the position or movements of a slug about the concave. For instance, in one routine the rotor is rotated automatically in at least one of the first and second rotational directions, and the rotation is automatically reversed responsive to presence of information representative of a predetermined loading condition opposing the rotation. This can be useful as it may indicate the location of the slug circumferentially about the concave and the severity of the blockage, and the routine is automatically adaptable using the Kalman filter or other suitable signal processor in a manner to more optimally dislodge, break up, free or progressively move the slug through the threshing system.

Another routine includes automatically rotating the rotor alternatingly in the first and second rotational directions through progressively increasing increments of rotational travel. As another routine, the rotor is automatically rotated alternatingly in the first and second rotational directions through increasing increments of rotational movement while the sensed information representative of loads opposing the rotation is monitored for information representative of a predetermined load level. Then, with the current and future state of the system determined using the Kalman filter, at least one subsequent increment of rotational movement is automatically altered responsive to presence of the information representative of the predetermined load level. Thus, for instance, a predetermined load level can represent contact or impact with a slug, and the alteration of the subsequent increment of rotation can include, for instance, but is not limited to, increasing an extent of a subsequent increment of rotation in the rotational direction for which the predetermined load level is present, or the speed of rotation, for instance, so as to move against the slug for dislodging or freeing it, or for generating a greater impulse force on impact with the slug.

Still another routine is an agitating routine wherein the rotor reciprocally moved in an agitating motion which can have predetermined or settable characteristics which can include, but are not limited to, rotational speed, profile, amplitude, frequency, waveform symmetry and duration. For instance, the agitation motion can be stronger and more forceful in one rotational direction compared to the other. Another routine is a jogging routine wherein the rotor is jogged in angular increments relative to the concave. The state of the system, as estimated or predicted using the Kalman or other suitable filter or routine, can be used for determining the parameters (rotational speed, profile, amplitude, frequency, waveform symmetry and duration, and jog) to be used in the selected deslugging routine.

Upon selection of a desired routine, the routine will be automatically executed by the control. Additionally, during or after the execution of at least one of the deslugging routines, the controller can be programmed to automatically store information representative of at least loading conditions sensed during the execution, and automatically select or adapt a subsequent deslugging routine for execution as a function of the stored information. A deslugging routine or strategy selection may be based upon any of a number of considerations or factors, such as the nature or type of crop being harvested, characteristics of the slugging condition, such as loads that arise during operation of the threshing system and/or initial deslugging steps which may be manually executed or automatic, again which can be done automatically using the estimated or predicted state of the threshing system from the Kalman filter in conjunction with accumulated run time adaptations of the baseline parameters.

DETAILED DESCRIPTION OF THE PREFERRED EMBODIMENTS

Figure 1:
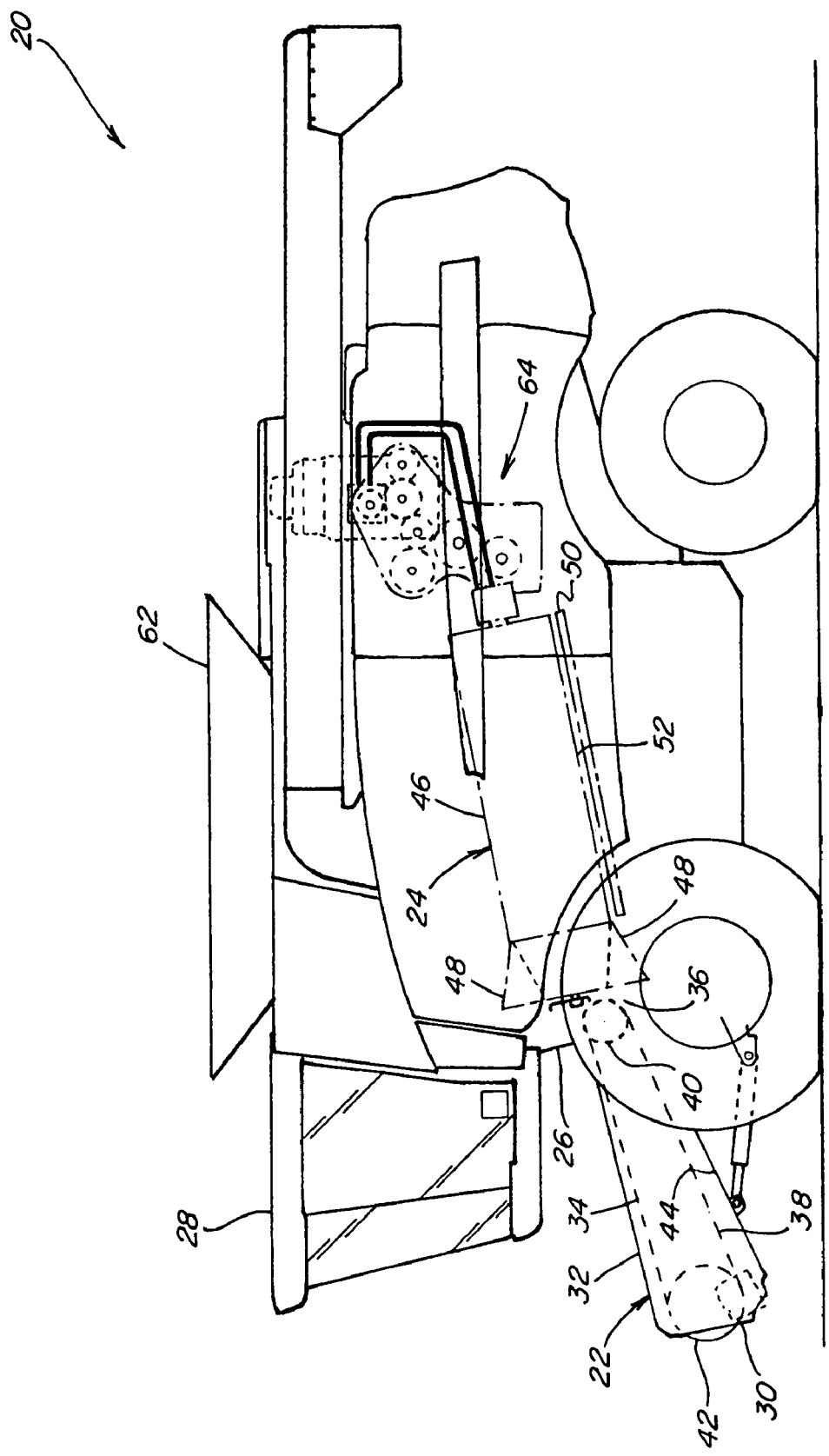
FIG. 1 is a side view of an agricultural combine including a feeder and a threshing system adapted for use with the deslugging methods and system of the invention.

Referring now to the drawings, wherein like numerals refer to like parts, in FIG. 1 an agricultural combine 20 is shown, including a feeder 22, and a threshing system 24, each of which is adapted for use with a deslugging method and system of the invention, as will be explained hereinafter.

Feeder 22 is mounted on a front end 26 of combine 20 generally beneath an operator cab 28. A header (not shown) is mountable on a forward end 30 of feeder 22, and is constructed and operable in the well-known manner for severing crops and other plant material from the ground as combine 20 is moved forwardly thereover, and conveying the cut crops and other plant material to an inlet opening on forward end 30 of feeder 22. Feeder 22 includes a feeder housing 32 containing a feed conveyor 34 operable for conveying the crops and other plant material upwardly and rearwardly through housing 32 into an inlet region 36 of threshing system 24. Feed conveyor 34 generally includes at least two endless chains 38 encircling drive sprockets 40 located in the rear end of feeder housing 32 and a drum 42 located in the forward end 30. A plurality of slats (not shown) extend between chains 38 and facilitate the conveying of the crop and other material through housing 32, in the well-known manner. In this latter regard, drive sprockets 40 will be rotated in a counterclockwise direction, for moving chains 38 and the slats upwardly and rearwardly along a floor 44 of housing 32, for conveying the crops and other material upwardly and rearwardly in that direction along the floor 44 to inlet region 36, also as is well known.

Figure 2:
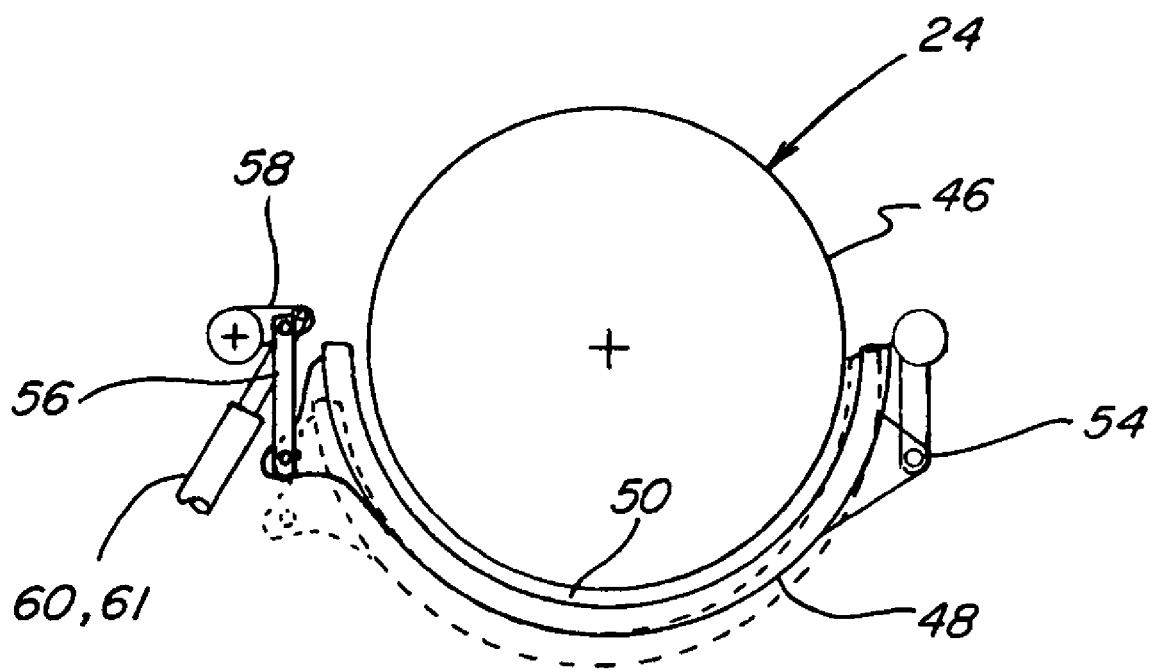
FIG. 2 is a simplified and view of a rotor and concave of the threshing system of the combine of FIG. 1, illustrating the concave in an alternative position moved away from the rotor for enlarging a crop separation clearance according to the invention.

Referring also to FIG. 2, threshing system 24 includes a rotatable, generally cylindrical rotor 46 including a tapered forward end having at least two vanes or flights 48 (FIG. 1) extending radially outwardly therefrom. At least the lower region of rotor 46 rearwardly of flights 48 is surrounded by a concave 50 located in radially outwardly spaced relation thereto, defining a crop separation clearance 52 extending circumferentially at least partially around the outer cylindrical surface of rotor 46. Referring more particularly to FIG. 2, concave 50 is supported beneath rotor 46 by a support structure including a pivotal connection 54 on one side, and one or more hanger straps 56 on the other side. Hanger strap 56 is connected to a free end of an adjusting arm 58 supported and controllably movable upwardly and downwardly by an actuator 60, which can be, for instance, a fluid cylinder. Actuator 60 is of well-known, conventional construction, and can be controlled by an operator using a control (not shown) in cab 28 in the well-known manner to precisely position concave 50 within a range of relatively more closely spaced positions in relation to rotor 46 (represented in solid lines) providing a crop separation clearance suitable for separation of grain from other crop material as rotor 46 is rotated. The position of concave 50 can be sensed or determined in the conventional, well known manner using a concave position sensor 61, which can be associated with or incorporated into actuator 60, or located elsewhere for sensing information representative of the position of concave 50 relative to rotor 46. Actuator 60 can also be controlled in the same manner to position concave 50 in at least one more lowered position (represented in dotted lines) wherein the crop separation clearance is opened so as to be suitable for facilitating deslugging operations according to the present invention, as will be explained. In some instances, concave 50 may constructed or supported so as to automatically drop or open to a lowered position, as a result of loads applied there against such as can result from a slug.

In operation, actuator 60 will be used to adjust the position of concave 50 and thus crop separation clearance 52, to provide desired threshing characteristics for the crop to be harvested and yields, under conditions present during the harvesting operation. As combine 20 is moved forwardly through a field, crops and other plants severed by the header (not shown) will be conveyed to feeder 22, and through feeder 22 to threshing system 24, wherein a mat of the crop and other plant material will move in a generally helical path through crop separation clearance 52, as effected by rotation of rotor 46. Grain and other small elements of plant material will then pass through arrays of openings or spaces in concave 50, so as to fall therefrom onto a cleaning system (not shown) of combine 20, which will further clean the grain from the other small elements of plant material. From the cleaning system, the clean grain will be conveyed into a clean grain tank 62, in the well-known conventional manner. Larger elements of plant material, such as straw, leaves, stalks, cobs, and the like, which do not pass through the openings of concave 50 are conveyed through crop separation clearance 52 past the rear end of rotor 46 and concave 50, and are disposed of through the rear end of combine 20, also in the well-known manner.

Figure 3:
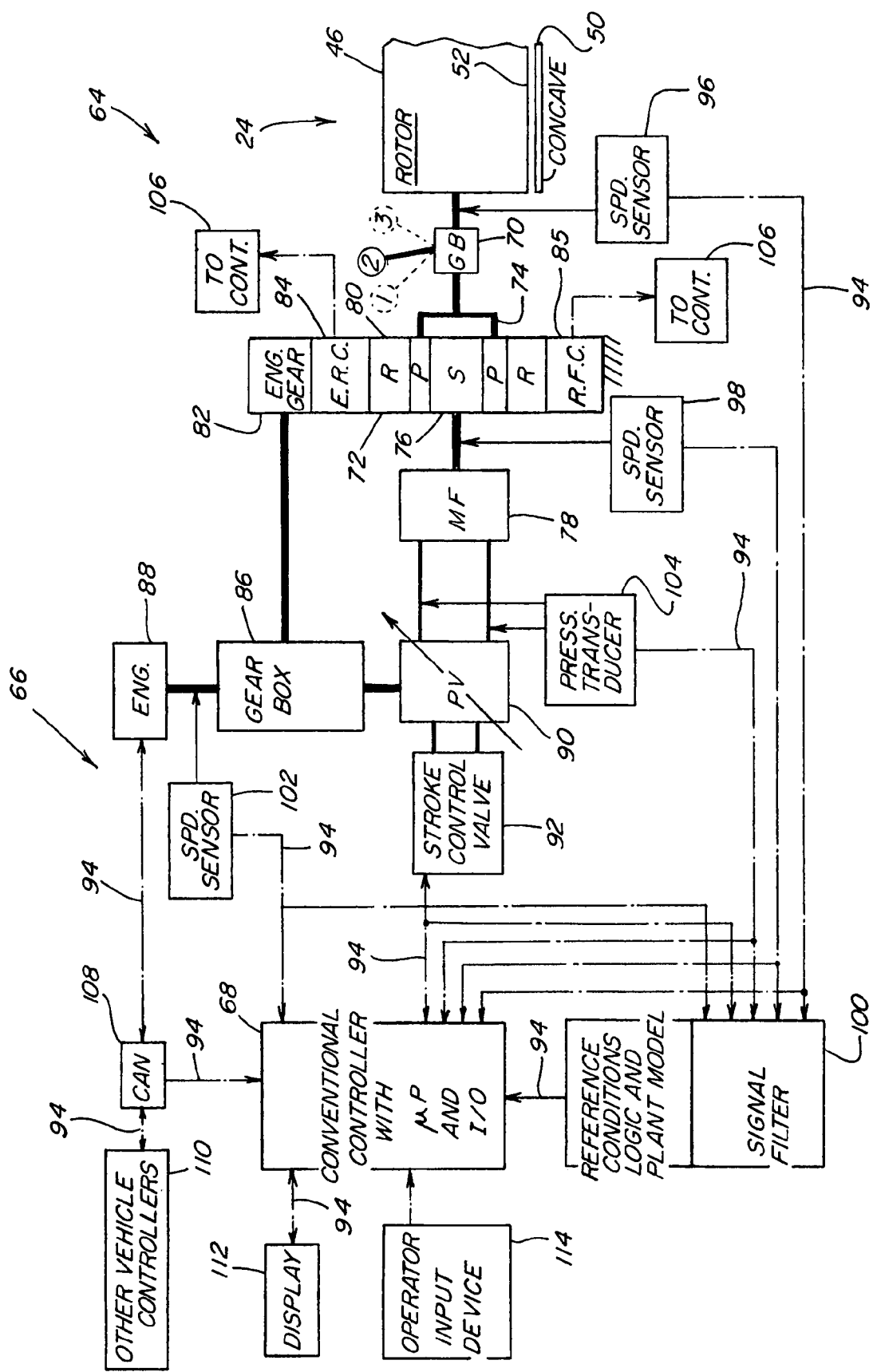
FIG. 3 is a simplified schematic of a drive and a control operable for rotating a rotor of the threshing system of the combine of FIG. 1, including for execution of the deslugging methods of the invention.

Referring also to FIG. 3, a drive 64 is connected in rotatably driving relation to rotor 46, and is controllably operable for rotating rotor 46 relative to concave 50, for threshing harvested crops as just explained. A control 66, preferably including a microprocessor based controller 68, is connected in operative control of drive 64, and with drive 64, comprises the system for deslugging threshing system 24 according to the teachings of the present invention.

Drive 64 includes a multiple speed transmission or gearbox 70 connected to rotor 46 for rotation therewith; a planetary gear arrangement 72 having a carrier 74 connected to gearbox 70 for rotation therewith; and a sun gear 76 in rotatable connection with a fluid motor 78. A ring gear 80 of arrangement 72 is rotatably connectable to an engine gear 82 by an engine to ring clutch 84. Engine gear 82, in turn, is rotatably connected via a gearbox 86 to an engine 88. Ring gear 80 is also connectable to the frame of the combine by a ring to frame clutch 85. Fluid motor 78 is connected in a fluid loop with a variable displacement fluid pump 90 for receiving pressurized fluid therefrom, the displacement of pump 90 being controllable by a stroke control valve 92. Stroke control valve 92 is connected via a conductive path 94 to controller 68 of control 66 for receiving control commands therefrom and outputting signals representative of stroke position thereto.

Control 66 includes several sensors for sensing information representative of the operating state and conditions of drive 64, including speed sensors 96 and 98 connected via conductive path 94 to controller 68, and also to a signal processing filter 100, which can be, for instance, a simplified Kalman type signal filter, or other suitable signal filtering and processing routine or device having capabilities useful for the purposes of the present invention. Speed sensors 96 and 98 are operable for sensing information representative of speeds of rotor 46 and sun gear 76, respectively, and outputting information representative thereof to controller 68. Another speed sensor 102 is connected via a conductive path 94 to controller 68 and is operable for sensing information representative of a speed of engine 88 and outputting the information to the controller. A pressure transducer 104 is connected via a conductive path 94 to controller 68 and to filter 100, and is operable for sensing pressure conditions in fluid lines extending to and from motor 78 and outputting information representative thereof to the controller and filter.

Still further, engine to ring clutch 84 and ring to frame clutch 85 are connected to controller 68, as indicated by boxes 106, for control thereby for rotatably connecting and disconnecting ring gear 80 and engine gear 82, and ring gear 80 and the frame of the machine, respectively. Control 66 is also connected by a controller area network (CAN) 108 to engine 88 and other vehicle controllers and systems, generally denoted by box 110, via suitable conductive paths 94. Controller 68 additionally is connected via one or more conductive paths 94 to one or more displays 112, and one or more operator input devices 114, located for instance, in operator cab 28, operable for displaying information, and inputting operator commands to control 66, respectively.

For operation in a threshing mode, an operator will select a gear range of gearbox 70 for achieving a desired rotational speed range for rotor 46, which is typically dependent on the crop type and any of a variety of other conditions, and pump 90 will be stroked and ring to frame clutch 85 and engine to ring clutch 84 sequentially engaged, as required, for achieving a desired rotor speed by a combination of hydrostatic and hydro-mechanic acceleration and speed control. Concave 50 will be positioned using actuator 60 (FIG. 2) as required for achieving a desired crop separation clearance 52. The speed of rotation of rotor 46 within the selected speed range can be varied by varying the stroke of pump 90, the state of engagement or disengagement of engine to ring clutch 84 and engine speed, and will also be affected by other factors such as crop loads and conditions, particularly the presence of a slug.

During normal harvesting, the commands outputted by controller 68 to stroke control valve 92, and information outputted by valve 92; information outputted by speed sensors 96, 98 and 102; and pressure information from transducer 104, are inputted to control 66 for processing by filter 100, wherein they can be used for modeling the threshing operation, particularly to estimate or predict the current state thereof to discern the, particularly relating to the presence of, and extent of, any slugging conditions. Likewise, during a deslugging routine or routines, this information can be utilized by controller 68 using filter 100 for evaluation of effectiveness of the routine or routines for present conditions, location and extent of a slugging condition, for use in selecting a subsequent deslugging routine. All deslugging processes are executed in the hydrostatic state with ring to frame clutch 85 engaged and engine to ring clutch 84 disengaged. The hydrostatic state permits forward and reverse rotary control.

The method and system of the invention provides several operator or automatically selectable automatic routines or methods of operation of a drive, such as drive 64, by a control, such as control 66, for rotating a rotor of a threshing system, such as rotor 46, for dislodging, breaking up or freeing slugs or clogs of plant material and/or debris from the crop separation clearance between the rotor and the concave.

Non-limiting examples of automatic deslugging routines of the invention include reciprocating actions or movements of controlled travel or extent, which will be a function of direction and duration of rotational movement of the rotor at the selected speed. Others automatically vary or alter the direction and/or duration of rotation in a direction responsive to sensed conditions representative of, for instance, opposition to the rotation resulting from a slug, and/or the position or movements of a slug about the concave, again filter 100 being usable for estimating the states of the threshing system for discerning the existence of and pertinent parameters of any slugs.

Another routine includes automatically rotating the rotor alternatingly in the first and second rotational directions through progressively increasing increments of rotational travel. As another routine, the rotor is automatically rotated alternatingly in the first and second rotational directions through increasing increments of rotational movement while the sensed information representative of loads opposing the rotation is monitored for information representative of a predetermined load level, which can be indicative of characteristics of a slugging condition, or success of the deslugging routine. This, and possibly other sensed information, as well as information representative of a state or states of the threshing system, can be used by control 66 for estimating a future state or states of the system, using filter 100. Then, at least one subsequent increment of rotational movement is automatically altered responsive to presence of the information representative of the predetermined load level. Thus, for instance, a predetermined load level can represent contact with a slug, and the alteration of the subsequent increment of rotation can include, for instance, but is not limited to, increasing an extent of a subsequent increment of rotation in the rotational direction for which the predetermined load level is present, or changing speed of rotation, so as to be more effective for dislodging, breaking up or freeing a slug. Another routine is an agitating routine wherein the rotor is reciprocally moved in an agitating motion which can have predetermined or settable characteristics which can include, but are not limited to, profile, amplitude, frequency, waveform symmetry and duration. Any of these characteristics can be adapted or modified based on changes between a past state of the system and the current state as estimated or predicted using filter 100.

Another routine is a jogging routine wherein the rotor is jogged in angular increments relative to the concave.

As noted above, a deslugging routine or strategy selection may be based upon any of a number of considerations or factors, such as the nature or type of crop being harvested, characteristics of the slugging condition, such as loads that arise during operation of the threshing system and/or initial deslugging steps which may be manually executed or automatic.

Figure 4:
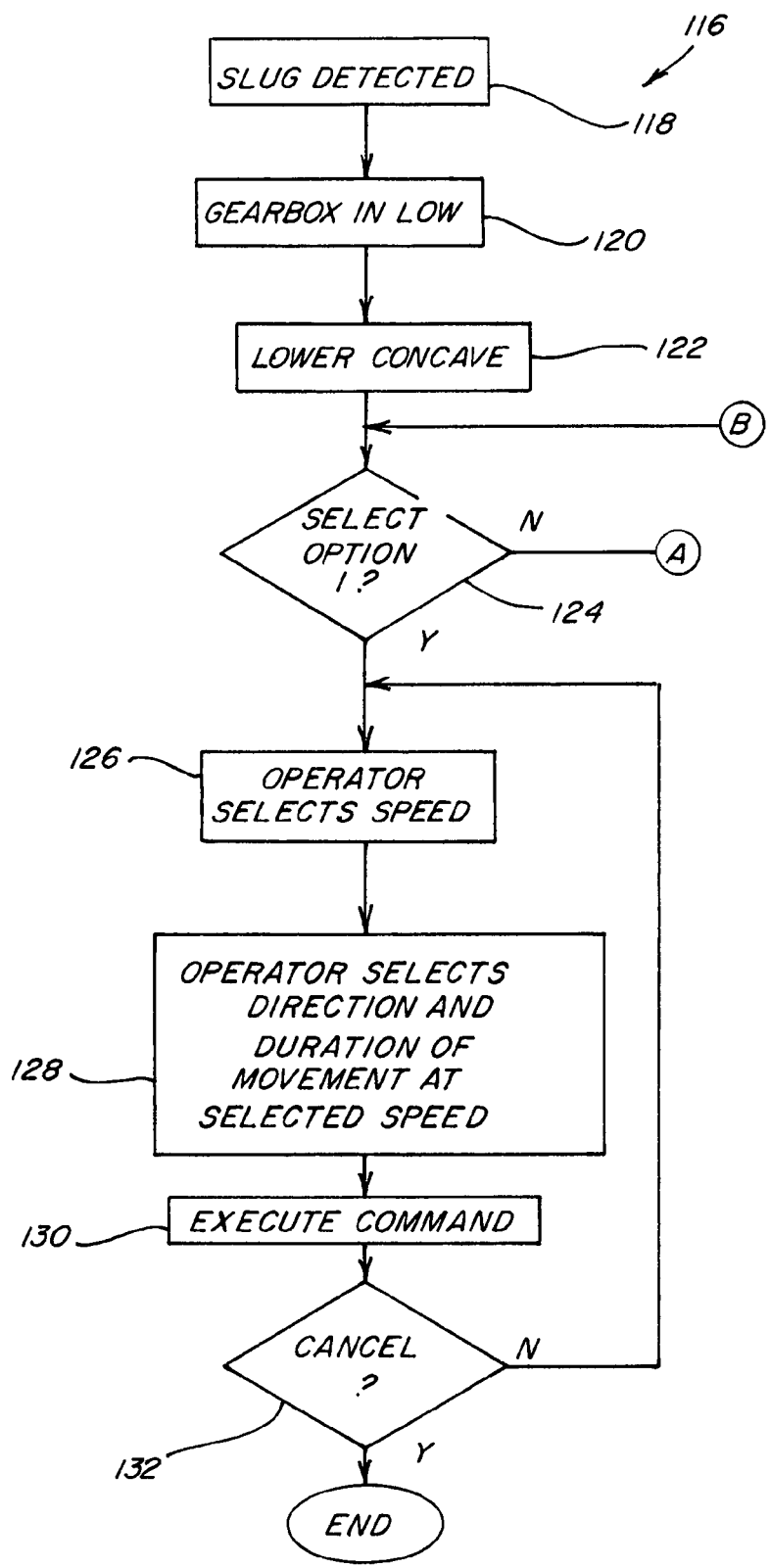
FIG. 4 is a high-level flow diagram illustrating steps of a method of the invention, including steps of a first selectable deslugging routine of the invention.
Figure 5:
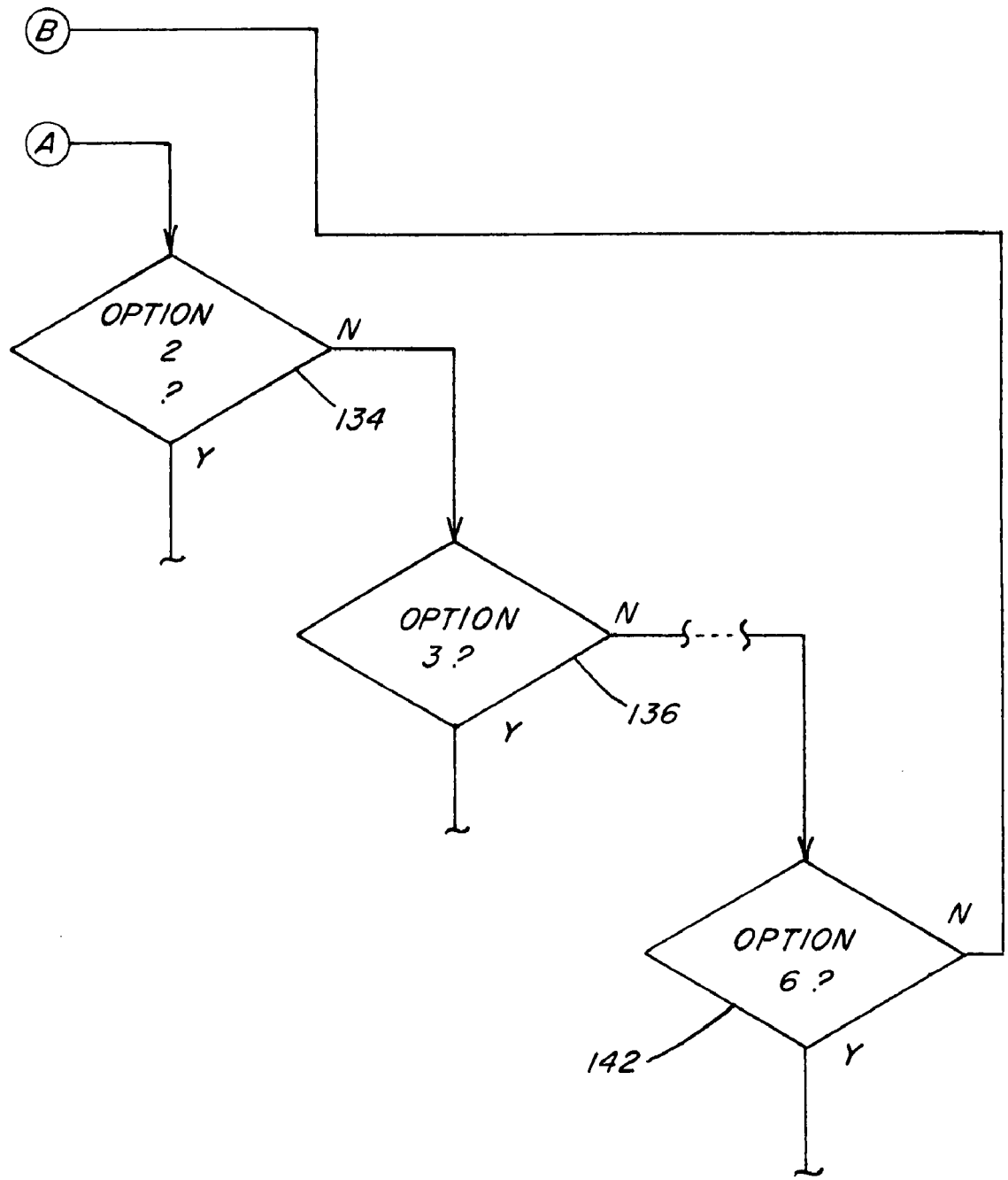
FIG. 5 is a continuation of the diagram of FIG. 4.

Preferred steps of exemplary routines of the method and system of the invention are illustrated in FIGS. 4, 5, 6, 7, 8, 9 and 10. Referring more particularly to FIGS. 3 and 4, in a flow diagram 116, once a slug or slugging condition of a threshing system such as threshing system 24 is detected, a warning may be outputted to the operator, and the rotor will be brought to a halt. In each instance, as denoted at block 118, the multiple speed gearbox (if any) will preferably be shifted to a low gear if not already in low, and the concave will be lowered to increase the crop separation clearance, as denoted by blocks 120 and 122. These steps can be performed by the operator, or automatically. Next, for instance utilizing display 112, several selectable deslugging routines will be displayed and can be selected using, for instance, input device 114. At decision block 124, controller 68 will determine if option 1 of the several options is selected. If so, the operator will input a speed and select a direction and duration of movement of rotor 46, as denoted at blocks 126 and 128. This can include a single direction of movement, or an initial direction. In the former instance, if only a single speed, direction and duration of movement are selected, when executed, as denoted at block 130, controller 68 will responsively automatically initiate and execute a controlled rotation of rotor 46 in a corresponding manner. In the latter instance, controller 68 will responsively automatically execute a controlled rotation of rotor 46 in the first selected direction at the selected speed for the selected duration, then reverse the direction of rotation and rotate rotor 46 in the opposite direction at the selected speed for the selected duration. Controller 68 will then determine whether the routine is to be canceled, as denoted at decision block 132, and if not, will return to block 126 and loop through execution block 130. Cancellation can be by the operator, or automatic, for instance, as a result of the occurrence of some condition, such as dislodgement of the slug.

Returning to decision block 124, and also viewing FIGS. 5, 6, 7, 8, 9 and 10, if option 1 is not selected, controller 68 will determine an option 2 is selected (FIGS. 5 and 6), as denoted at decision block 134, and if that option is not selected, will proceed to sequentially determine whether any of the subsequent available options are selected, as denoted by the sequence of decision blocks 136, 138, 140 and 142. Here, it should be recognized and understood that, although six optional selectable deslugging routines are presented, a greater or lesser number can be utilized within the teachings of the present invention.

Figure 6:
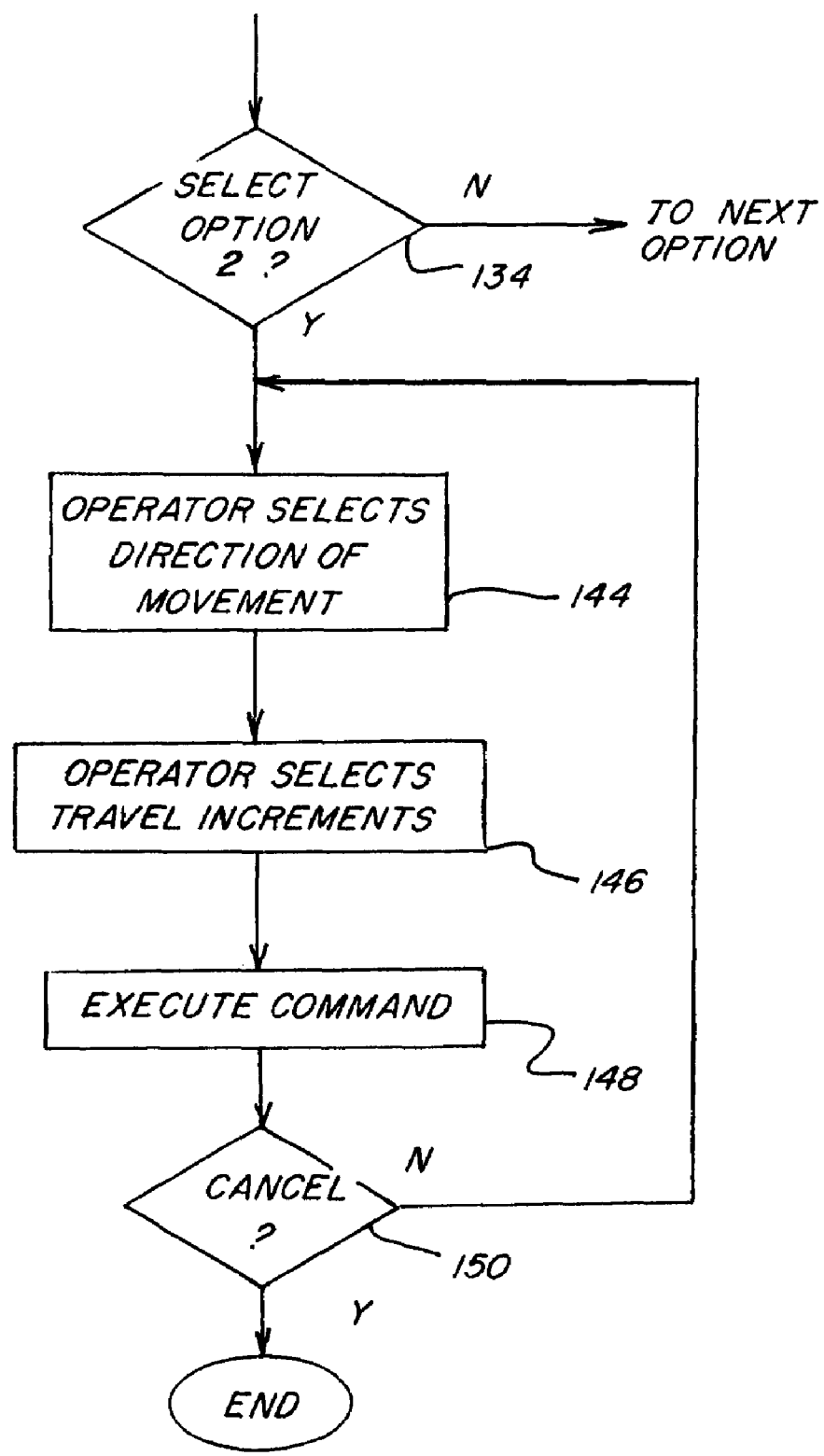
FIG. 6 is another continuation of the diagram of FIGS. 4 and 5, illustrating steps of a second selectable deslugging routine.

Going through the exemplary options, as illustrated in FIG. 6, if option 2 is selected, the operator will select a direction of movement, as denoted at block 144, and a travel increment, as denoted at block 146. Controller 68 will then execute the commanded routine as denoted at block 148. The routine can then be canceled, as denoted at decision block 150, or the direction of movement and travel increment changed as the controller loops through blocks 144, 146, 148 and 150. Cancellation can again be automatic, for instance, responsive to a sensed condition or information indicative of dislodgment or clearance of a slug, such as a reduced sensed pressure condition during rotation of the rotor, as can be determined by estimating or predicting the present or future state of the threshing system using filter 100.

Figure 7:
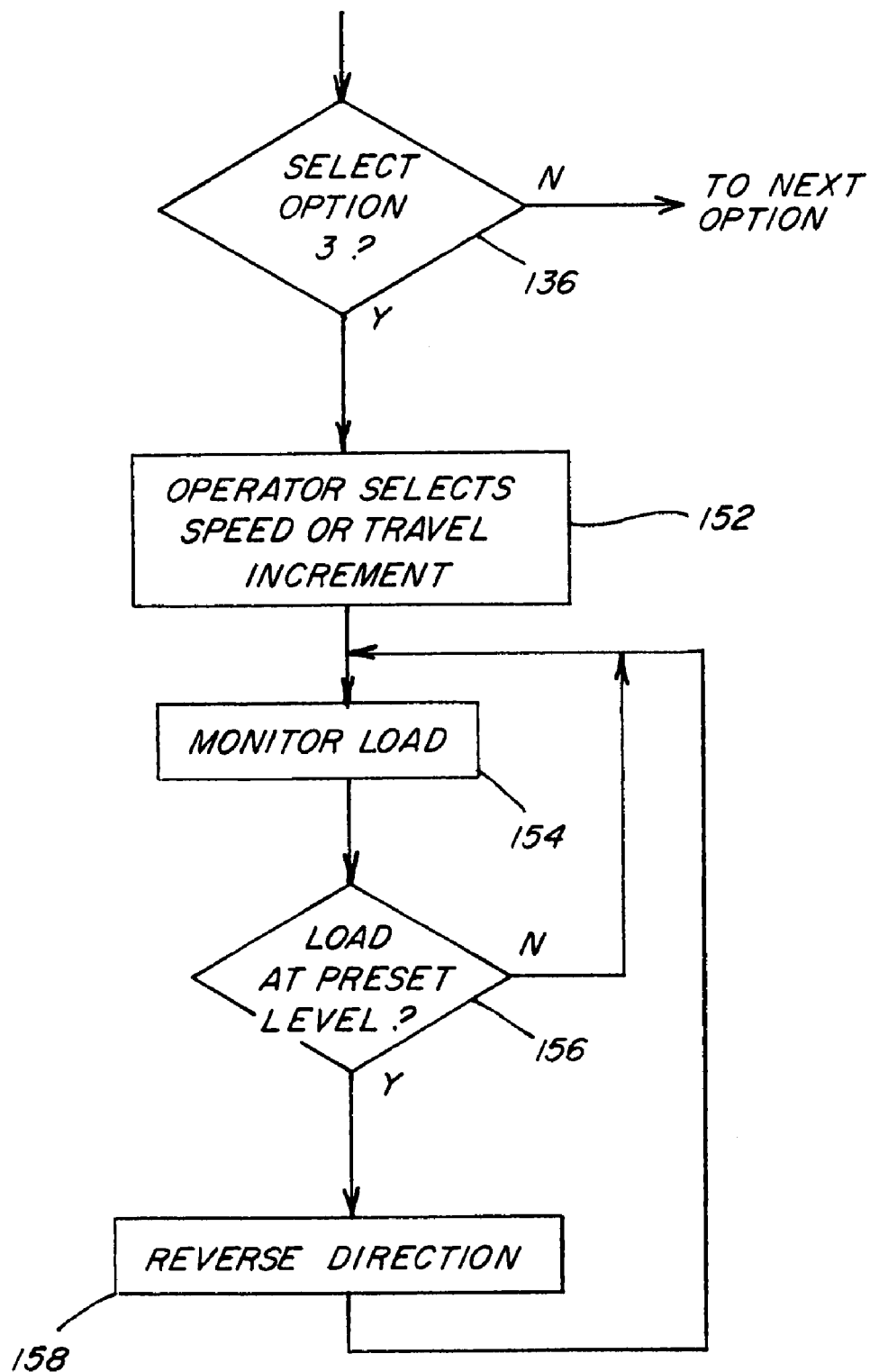
FIG. 7 is another continuation of the diagram of FIGS. 4, 5 and 6, showing steps of a third routine.

As illustrated in FIG. 7, if option 3 is selected, the operator will select a speed or travel increment, as denoted at block 152. Controller 68 will then rotate rotor 46 at the selected speed and/or increment while monitoring loading conditions exerted in response to the rotation, as denoted at block 154. If the monitored load does not reach a predetermined or preset level, as determined at decision block 156, controller 68 will loop through the steps of blocks 154 and 156 until the level is reached, or the routine is canceled, again, either by the operator or automatically. If the preset load level is reached, controller 68 will reverse the direction of rotation, as denoted at block 158 and return to block 154, and again monitor the loading conditions. If the preset loading level is not reached, the controller will continue to rotate the rotor in the latest direction while looping through the steps of blocks 154 and 156. If, at block 156 it is determined that the preset load level has been reached, the direction of rotation will again be reversed and the controller will continue to monitor loads. As a result, rotor 46 will be alternatingly rotated at the selected speed, and/or to the selected extent of travel, in the opposite directions, responsive to the reaching of the preset load level. This routine will be repeated, or can be canceled after some condition is met or detected.

Figure 8:
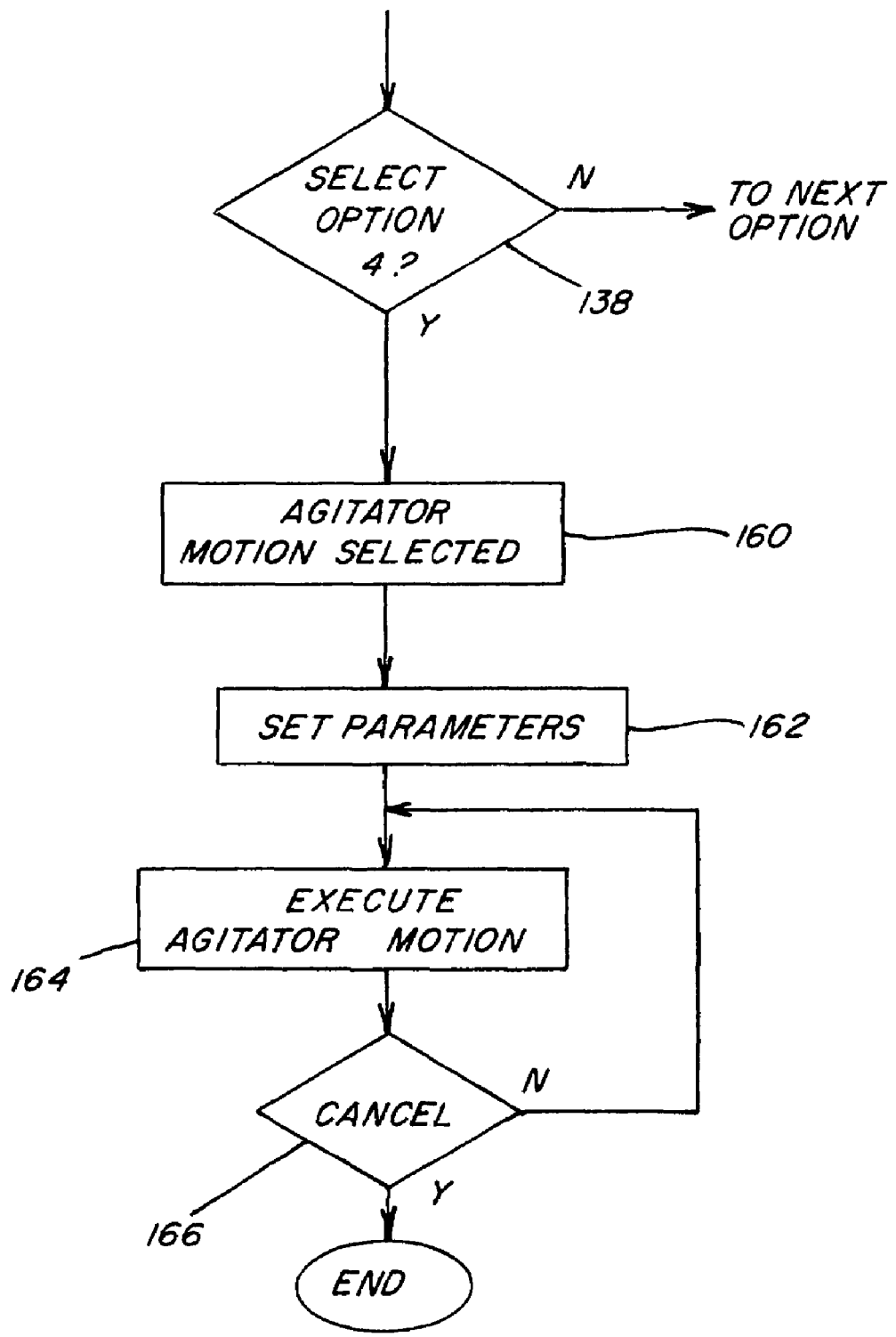
FIG. 8 is another continuation of the diagram, illustrating steps of a fourth routine.
Figure 9:
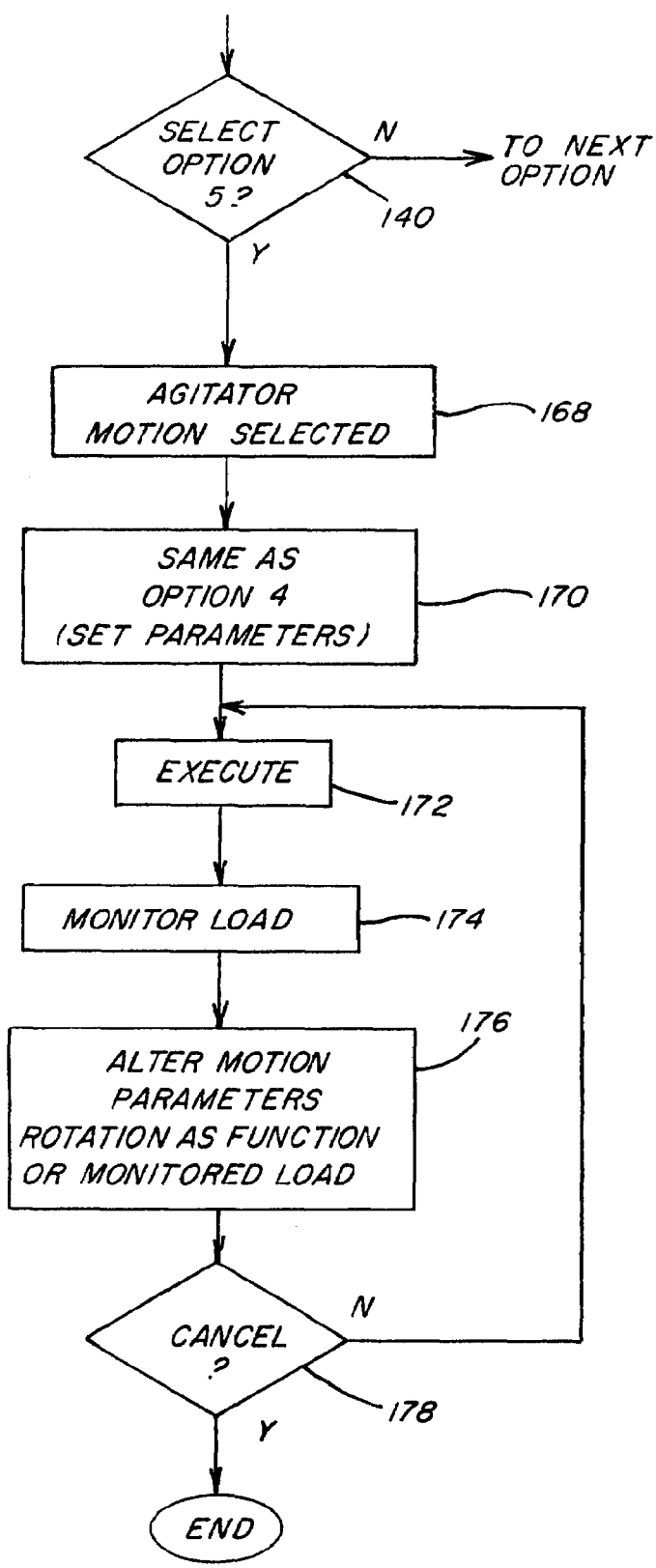
FIG. 9 is another continuation of the diagram, illustrating steps of still another deslugging routine.
Figure 10:
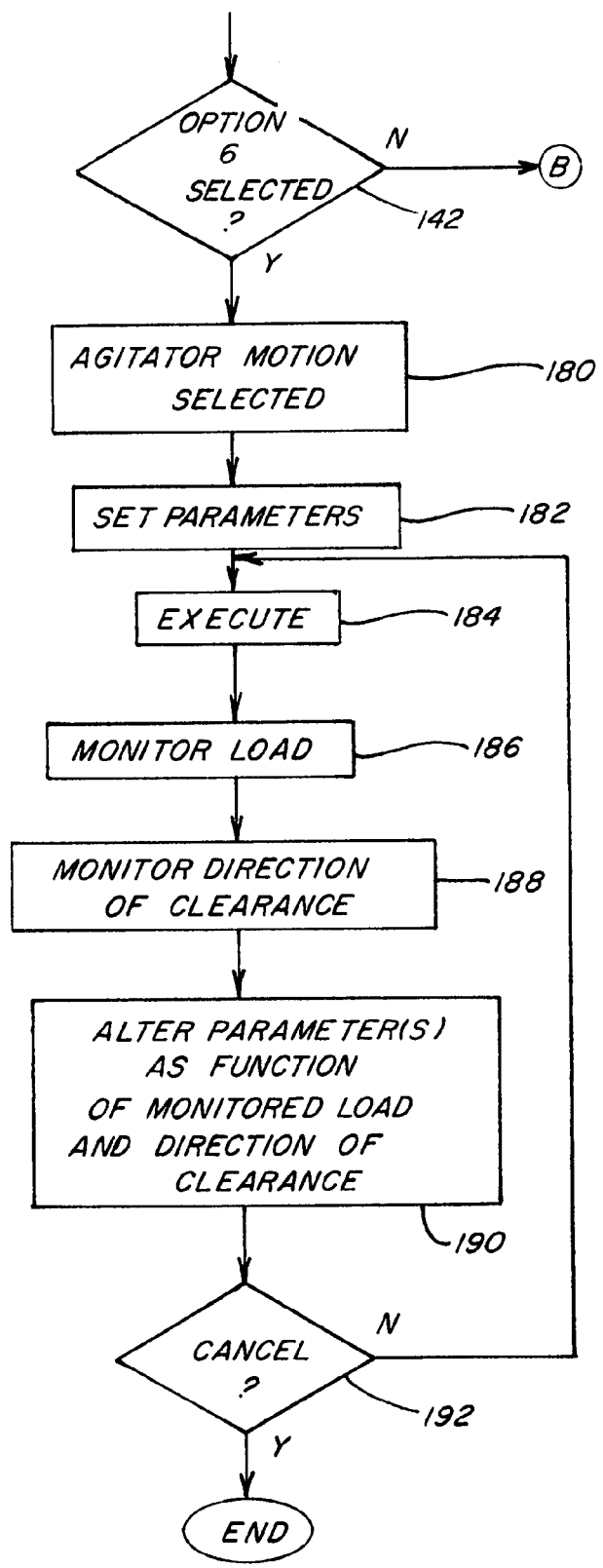
FIG. 10 is still another continuation of the diagram, illustrating still another deslugging routine.

In FIGS. 8, 9 and 10, steps of several agitating routines are illustrated. Referring to FIG. 8, if, at decision block 138 option 4 is selected, an agitation motion is selected, as denoted at block 160. As a result, controller 68 will prompt the operator to select preset parameters of the agitator motion or set new parameters, as summarized at block 162. Such parameters can include, but are not limited to, speed of rotation, motion profile, amplitude, frequency, waveform symmetry and duration. Once the parameters are set, controller 68 will execute the agitator motion, as denoted at block 164, until the routine is canceled, as denoted at decision block 166. Again, cancellation can be initiated by operator action, or automatically. Any of the parameters, for instance, frequency, can be modified automatically by controller 68, based on the estimated state of the threshing system determined using filter 100.

Also referring to FIG. 9, a fifth option is an agitator motion routine wherein during the execution of the routine, loading conditions are monitored and the motion parameters (e.g., speed, profile, amplitude, frequency, waveform symmetry and/or duration) are automatically altered as a function of the monitored load, as denoted by the sequence of steps of blocks 168, 170, 172, 174 and 176. This sequence of steps will be repeated in a looping action until canceled, as denoted by block 178.

Finally, referring to FIG. 10, selection of a sixth option, as denoted at block 142, will initiate operation in an agitator motion, as denoted at block 180, wherein the loading conditions will be monitored, as well as a direction of clearance. In this mode, parameters of the agitator motion (speed, profile, amplitude, frequency, waveform symmetry and/or duration) are set, as denoted at block 182, and can be individually selected by the operator, or can be predetermined or preset. Controller 68 will then execute the agitator motion, as denoted at block 184. During the rotation of rotor 46 in the agitator motion, controller 68 will monitor both load and direction of clearance, as denoted at blocks 186 and 188. Here, direction of clearance connotes a direction of rotation which is not impeded or is less impeded by the slug sought to be cleared or dislodged. That is, when rotor 46 is rotated in one direction, elevated loading conditions will be encountered which will be indicative of encountering the slug, which elevated loading conditions will not be encountered or will be less when rotor 46 is rotated in the opposite direction. Such elevated loading conditions can be determined as a function of pressure conditions sensed by transducer 104. As a result of the presence of such elevated loading conditions and information representative of the direction of rotation in which such loading conditions are encountered, one or more of the motion parameters can be altered, to effect a successful deslugging strategy, as denoted at block 190. After execution of the altered motion, if conditions indicative of clearing of the slug are present (e.g. reduced pressure when rotating the rotor in the direction wherein the elevated loading conditions were encountered), the routine can be canceled, either by an operator or automatically, as denoted at block 192. Again, any of the parameters for the deslugging routines just discussed, can be modified automatically by controller 68, based on the estimated state of the threshing system determined using filter 100.

Additionally, during or after the execution of at least one of the deslugging routines, controller 68 can be programmed to automatically collect and store information representative of at least loading conditions sensed during the execution, for instance as filtered and processed using filter 100, and automatically select a subsequent deslugging routine for execution as a function of the stored information and/or modeled system. A deslugging routine or strategy selection may be adapted and based upon any of a number of considerations or factors, such as the nature or type of crop being harvested, characteristics of the slugging condition, such as loads that arise during operation of the threshing system and/or initial deslugging steps which may be manually executed or automatic.

As a result of the above disclosure, it should be apparent that the deslugging method and system of the invention have utility for improving the ability to effectively dislodge, break up and/or free slugs from a threshing system of a combine, such as system 24 of combine 20, while decreasing occurrences of problems such as damage to the threshing system or drive, which can occur as a result of a variety of factors such as inappropriate speeds, impulse loading conditions, and the like. It should also be apparent that the automatic deslugging routines of the invention can be executed in a more controlled and precise manner, compared to execution of similar routines under operator control wherein operator skill level, experience and other factors will impact the effectiveness. For instance in this regard, the ability of the system of the invention to monitor and respond to sensed loading condition will be expected to be substantially better than the response of an operator to such conditions, at least in part as a result of the signal filtering and processing using filter 100. It should also be understood that although the preferred signal processing filter 100 is of the simplified Kalman type, other suitable filters or routines may be used by control 66 for discerning the state of the threshing system for the purposes of the present invention.

It should also be recognized and understood that the method and system of the invention can be applied to operation of a feed conveyor, such as conveyor 34 of feeder 22.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. Accordingly, the following claims are intended to protect the invention broadly as well as in the specific form shown.

What is claimed is:

1. A method for deslugging a threshing system of an agricultural combine, comprising steps of:
   providing a drive controllably operable for rotating a rotor of the threshing system within a concave thereof, in opposite first and second rotational directions;
   providing a control in operative control of the drive;
   providing a sensor for sensing information representative of load conditions opposing rotation of the rotor;
   providing a plurality of selectable deslugging routines automatically executable by the control for controlling the drive, including:
   a. a routine wherein the rotor is automatically rotated alternatingly in the first rotational direction and in the second rotational direction, through predetermined increments of rotational travel;
   b. a routine wherein the rotor is automatically rotated in at least one of the first and second rotational directions, and wherein the rotation is automatically reversed responsive to presence of information representative of a predetermined loading condition opposing the rotation;
   c. a routine wherein the rotor is automatically rotated alternatingly in the first and second rotational directions through progressively increasing increments of rotational travel; and
   d. a routine wherein the rotor is automatically rotated alternatingly in the first and second rotational directions through increasing increments of rotational movement while the sensed information representative of loads opposing the rotation is monitored for information representative of a predetermined load level, and wherein at least one subsequent increment of rotational movement is automatically altered responsive to presence of the information representative of the predetermined load level.

2. The method of claim 1, comprising a step of providing an actuator controllably operable for moving the concave in a direction away from the rotor for increasing a separation clearance between the concave and the rotor, and a step of moving the concave in the direction away from the rotor before or during initial rotation of the rotor during execution of a selected one of the deslugging routines.

3. The method of claim 1, wherein when the information representative of the predetermined load level is present, the step of altering at least one subsequent increment of rotation will comprise increasing an extent of a subsequent increment of rotation in the rotational direction for which the predetermined load level is present.

4. The method of claim 1, comprising a further step of automatically terminating the execution of the selected routine when information representative of successful deslugging of the threshing system is present.

5. The method of claim 4, wherein the information representative of successful deslugging of the threshing system comprises sensing a decreased load condition opposing the rotation of the rotor indicative of dislodging of a blockage from between the rotor and the concave.

6. The method of claim 1, wherein during or after the execution of at least one of the deslugging routines, the control will automatically store information representative of at least loading conditions sensed during the execution, and automatically select a subsequent deslugging routine for execution as a function of the stored information.

7. The method of claim 1, wherein the drive comprises a fluid driven motor, and the information representative of the predetermined loading condition opposing the rotation is determined as a function of a pressure condition of fluid driving the motor.

8. The method of claim 1, comprising a step of providing a second sensor for sensing information representative of a speed of rotation of the rotor, and the information representative of the predetermined loading condition opposing the rotation is determined as a function of sensed information representative of a speed of rotation of the rotor.

9. The method of claim 1, wherein the drive comprises a multiple speed range transmission, and the method comprises a step of selecting a low transmission speed range prior to initiating the rotation of the rotor.

10. The method of claim 1, wherein the step of providing a plurality of selectable deslugging routines includes a routine wherein the rotor is automatically jogged in one of the rotational directions.

11. The method of claim 1, wherein the step of providing a plurality of selectable deslugging routines includes a routine wherein the rotor is automatically rotated in a reciprocating agitating motion having at least one predetermined characteristic.

12. The method of claim 11, wherein the at least one predetermined characteristic comprises an amplitude.

13. The method of claim 11, wherein the reciprocating agitator motion has a predetermined waveform shape.

14. The method of claim 13, wherein the waveform shape is asymmetrical.

15. A method for dislodging a slug in a space between a rotatable rotor and a concave of a threshing system of an agricultural combine, comprising steps of:
   providing a control in operative control of a drive operable for rotating the rotor in a first rotational direction and in a second rotational direction opposite the first rotational direction;
   providing a sensor for sensing information representative of loads opposing rotation of the rotor and outputting a signal representative of the information to the control;
   providing a plurality of selectable deslugging routines automatically executable by the control, including:

a. a routine wherein the rotor is rotated reciprocally in the first and second rotational directions while sensing loads opposing the rotation, determining if the sensed loads are greater in one of the rotational directions, and, if so, then increasing an extent of rotational movements in the one of the directions in which the sensed loads are greater;

b. a routine wherein the rotor is controllably rotated in at least one of the first and second rotational directions, and reversing the direction of the rotation when information representative of a predetermined lead level opposing the rotation is present; and c. a routine wherein the rotor is rotated alternatingly in the first and second rotational directions through increasing extents of rotational movement;

d. a routine wherein the rotor is automatically rotated alternatingly in the first and second rotational directions through increasing increments of rotational movement while the sensed information representative of loads opposing the rotation is monitored for information representative of a predetermined load level, and wherein at least one subsequent increment of rotational movement is automatically altered responsive to presence of the information representative of the predetermined load level; and selecting and automatically executing at least one of the routines.

16. The method of claim 15, wherein the plurality of selectable deslugging routines automatically executable by the control additionally includes a routine wherein the rotor is automatically rotated in an agitating motion having a predetermined profile of agitation.

17. The method of claim 15, comprising a step of providing an actuator controllably operable for moving the concave in a direction away from the rotor for increasing a separation clearance between the concave and the rotor, and a step of moving the concave in the direction away from the rotor before or during initial rotation of the rotor during execution of a selected one of the deslugging routines.

18. The method of claim 15, comprising a further step of automatically canceling the execution of the selected routine when the slug is dislodged.

* * * * *